United States Patent
Loreskar et al.

(10) Patent No.: US 12,096,223 B2
(45) Date of Patent: Sep. 17, 2024

(54) REMOTE SECURE UNLOCK

(71) Applicant: TRUSTONIC LIMITED, Cambridge (GB)

(72) Inventors: Chris Loreskar, Cambridge (GB); Derick Cassidy, Cambridge (GB); John Dent, Cambridge (GB)

(73) Assignee: Trustonic Limited, Cambridge (GB)

( * ) Notice: Subject to any disclaimer, the term of this patent is extended or adjusted under 35 U.S.C. 154(b) by 403 days.

(21) Appl. No.: 17/608,211

(22) PCT Filed: May 1, 2020

(86) PCT No.: PCT/GB2020/051074
§ 371 (c)(1),
(2) Date: Nov. 2, 2021

(87) PCT Pub. No.: WO2020/225536
PCT Pub. Date: Nov. 12, 2020

(65) Prior Publication Data
US 2022/0210652 A1    Jun. 30, 2022

(30) Foreign Application Priority Data

May 3, 2019    (GB) ...................................... 1906276
Nov. 22, 2019    (GB) ...................................... 1917051

(51) Int. Cl.
*H04W 12/00* (2021.01)
*H04W 8/18* (2009.01)
(Continued)

(52) U.S. Cl.
CPC ........... *H04W 12/35* (2021.01); *H04W 8/183* (2013.01); *H04W 12/06* (2013.01); *H04W 12/37* (2021.01);
(Continued)

(58) Field of Classification Search
CPC ..... H04W 12/35; H04W 12/72; H04W 12/37; H04W 12/45; H04W 8/183; H04W 12/26; H04W 48/18
See application file for complete search history.

(56) References Cited

U.S. PATENT DOCUMENTS

| 2008/0090614 A1 | 4/2008 | Sicher et al. |
| 2016/0057624 A1 | 2/2016 | Yang et al. |
| 2017/0134298 A1* | 5/2017 | Walke .................. H04M 17/10 |

OTHER PUBLICATIONS

International Search Report for PCT/GB2020/051074 mailed Jun. 3, 2020, 2 pages.

(Continued)

*Primary Examiner* — Curtis B Odom
(74) *Attorney, Agent, or Firm* — NIXON & VANDERHYE P.C.

(57) ABSTRACT

A method for remotely performing secure change of operational mode of a telecommunications device, the method comprising: establishing a first secure channel between a modem of the telecommunications device and an application executing in an Execution Environment of the telecommunications device; establishing a second secure channel between the application and a remote server; enabling the modem in a limited operational mode; generating a request, by the modem or the application, to verify the validity of a subscriber identity module of the telecommunications device; retrieving, by the modem, module identification information from the subscriber identity module; retrieving verification information, by the application and from the remote server, using the second secure channel, sending the module identification information from the modem to the application using the first secure channel, verifying at the application whether the subscriber identity module is valid using the module identification information and the verification information, and sending the verification result from the application to the modem using the first secure channel, or retrieving verification information, by the application and from the remote server, using the second secure channel, sending the verification information from the application to the modem using the first secure channel and verifying at the modem whether the subscriber identity module is valid using the module identification information and the verification information, or sending the module identification information from the modem to the remote server, verifying at the remote server whether the subscriber identity module (Continued)

is valid using the module identification information and verification information available at the server, sending the verification result from the remote server to the application using the second secure channel, and sending the verification result from the application to the modem using the first secure channel; responsive to a positive verification of the subscriber identity module transitioning the modem from the limited operational mode to an enhanced operational mode.

23 Claims, 7 Drawing Sheets

(51) Int. Cl.
*H04W 12/06* (2021.01)
*H04W 12/30* (2021.01)
*H04W 12/37* (2021.01)
*H04W 12/45* (2021.01)
*H04W 12/72* (2021.01)
*H04W 48/18* (2009.01)

(52) U.S. Cl.
CPC ........... *H04W 12/45* (2021.01); *H04W 12/72* (2021.01); *H04W 48/18* (2013.01)

(56) References Cited

OTHER PUBLICATIONS

Written Opinion of the ISA for PCT/GB2020/051074 mailed Jun. 3, 2020, 9 pages.

* cited by examiner

REMOTE SECURE UNLOCK

CROSS-REFERENCE TO RELATED APPLICATIONS

This application is the U.S. national phase of International Application No. PCT/GB2020/051074 filed May 1, 2020 which designated the U.S. and claims priority to GB Patent Application No. 1906276.9 filed May 3, 2019, and GB Patent Application No. 1917051.3 filed Nov. 22, 2019 the entire contents of each of which are hereby incorporated by reference.

FIELD AND BACKGROUND

The present techniques relate to the field of locking and unlocking mobile devices. More particularly, the described techniques relate to various techniques by which a remote entity such as a server operated by a mobile network operator can control whether a mobile device is allowed to operate in an enhanced operation mode or is only permitted to operate in a limited operation mode.

In certain prior approaches various techniques have been provided which allow a network operator to control the operation mode of a mobile device, for example, when a subsidised mobile device has been provided to a user subject to the user maintaining a network services subscription such that if the user allows the subscription to lapse the mobile device is only permitted to operate in a limited operation mode.

However, certain malicious parties have developed a number of technical workarounds to disable or circumvent the network operator's control of the operation mode of the mobile device.

At least certain embodiments of the present disclosure address one or more of these problems as set out above.

SUMMARY

Particular aspects and embodiments are set out in the appended claims.

Viewed from one perspective there can be provided a method for remotely performing secure change of operational mode of a telecommunications device, the method comprising: establishing a first secure channel between a modem of the telecommunications device and an application executing in an Execution Environment of the telecommunications device; establishing a second secure channel between the application and a remote server; enabling the modem in a limited operational mode; generating a request, by the modem or the application, to verify the validity of a subscriber identity module of the telecommunications device; retrieving, by the modem, module identification information from the subscriber identity module; retrieving verification information, by the application and from the remote server, using the second secure channel, sending the module identification information from the modem to the application using the first secure channel, verifying at the application whether the subscriber identity module is valid using the module identification information and the verification information, and sending the verification result from the application to the modem using the first secure channel, or retrieving verification information, by the application and from the remote server, using the second secure channel, sending the verification information from the application to the modem using the first secure channel and verifying at the modem whether the subscriber identity module is valid using the module identification information and the verification information, or sending the module identification information from the modem to the remote server, verifying at the remote server whether the subscriber identity module is valid using the module identification information and verification information available at the server, sending the verification result from the remote server to the application using the second secure channel, and sending the verification result from the application to the modem using the first secure channel; responsive to a positive verification of the subscriber identity module transitioning the modem from the limited operational mode to an enhanced operational mode.

As discussed further below the above approach covers three options where the verification of the subscriber identity module can be performed: A: the verification is performed by the application; B the verification is performed by the modem; C the verification is performed by the remote server. Prior to verification the telecommunications device defaults to a limited operational mode.

However, in each of A, B, and C the application is required to perform one or more steps to allow the verification to be successfully performed. Accordingly, the present approach enhances security of the verification process as this verification process cannot be bypassed by deleting the application (e.g. by rooting the device) since if the application is deleted the verification process cannot be passed and accordingly the modem would remain in a limited operational mode. The application thereby acts a primary modem control point.

This requirement for the application to be present further enhances security, as the application is capable of supporting additional security measures and checks discussed in the further examples below. Furthermore the application, being software, can be straightforward to update Over-the-Air (OTA), for example, in response to security being compromised.

By allowing for the verification information to be received from a remote server (options A or B) the verification information can be provided after the device is powered up, for example by the end user. This means that verification information does not need to be provided at the time of manufacture and the devices can be produced as a single Stock Keeping Unit (SKU) i.e. without the need for batches of devices to be individually tailored for mobile network operators during manufacture. From another perspective, the devices can be tailored as part of the first power on by, for example, the end user. As part of this first power on by the end user, the end user can be prompted to provide information provided by a mobile network operator.

The verification information can include information on the rules governing which subscriber identity modules the telecommunications device is allowed to operate with and the conditions of operation of the device in conjunction with particular subscriber identity modules. In some examples, the verification information can include other information which dictates the operation of the telecommunications device, such as geographic, time or functionality restrictions. In some examples, the telecommunications device can be shipped in a "locked" state where the device will initially reject all subscriber identity modules until verification information has been retrieved. In some examples, the remote server storing the verification information can be operated by the mobile network operator, in other examples the remote server may be operated by the device manufacturer or third party.

As set out above there are three options where the verification of the subscriber identity module can be performed which have associated further effects and advantages.

By performing the verification at the application, option "A", complex verification methods and functionality can be supported, examples of which are discussed below. In some examples, the application can support complex verification methods and functionality as it is executed on a "full" application processor. By performing the verification at the application, the verifying element (i.e. the application) can be straightforwardly replaced or updated, for example, in response to a security flaw or to introduce new functionality. In some examples, where there are a plurality of subscriber identity modules with a corresponding plurality of (modem modules), performing verification on the application provides for a single centralised point of verification control.

By performing the verification at the modem, option "B", the need to send the module identification information to any other element is avoided hence making the module identification information hard to intercept and/or duplicate hence enhancing security. In addition, option B allows for the need for sending the verification result to be avoided hence also making it hard to intercept and/or duplicate the verification result hence enhancing security.

By performing the verification at the remote server, option "C", the verification information can be protected and hidden from the end user (device) and kept in a trusted environment. Furthermore, locating the verification mechanism at the remote server allows for the verification mechanism and verification information to be dynamically adjusted. In other words, as long as the remote server is trusted, approach C makes it hard for a malicious party to hack or disrupt the verification mechanism and/or validation information. This approach avoids the need to send the verification information hence making it hard to intercept and/or duplicate this information. In some examples, where there are a plurality of subscriber identity modules with a corresponding plurality of (modem modules), performing verification on the remote server provides for a single centralised point of verification control.

In each of options A, B and C, listed above, when any of the module identification information, the verification information, and the verification result are sent between the modem and application within the telecommunications device they are sent using the first secure channel. This enhances security by protecting the information being sent by making it hard to intercept, read, or modify.

Similarly, in each of options A, B and C listed above when any of the module identification information, the verification information, and the verification result are sent between the application and remote server they are sent using the second secure channel. This enhances security by protecting the information being sent by making it hard to intercept, read, or modify.

In option C, when the modem sends the module identification information to the remote server this may be sent in a number of different manners. In some examples, the modem may first send the module identification information to the application via the $1^{st}$ secure channel and then the application sends this information on to the remote server using the $2^{nd}$ secure channel. In other examples, the modem and remote server may have a $3^{rd}$ secure channel between themselves. The security of the $3^{rd}$ secure channel can be based on a key pair embedded during manufacture.

In some examples, the keys for the modem and application are unique such that a single compromised device will not render the security of, for example a whole batch which share the same keys with each other, ineffective.

In some examples, the limited operational mode represents a mode where restrictions are placed on the modem and/or overall device. For example, in a limited operational mode phone calls could be restricted to be blocked or just to emergency calls; and/or in a limited operational mode text messages could be blocked, and/or in a limited operational mode data connection could be blocked, limited in bandwidth, and/or limited in usage; and/or in a limited operational mode restrictions could be applied to other elements of the device such as controlling/disabling Wi-Fi, controlling/disabling Bluetooth, and/or other disabling the ability to execute certain applications. In the above-described limitations, the limitations could apply all the time or only apply during certain days/times. In the enhanced operational mode, one or more of these restrictions are lifted.

In some examples, the application is a trusted application and the Execution Environment is a Trusted Execution Environment. Thereby the code of the application is protected from inspection or modification in a robust manner ensuring that the application is secure. The Trusted Execution Environment (TEE) acts as a secure area of a processor in which to execute sensitive applications and processes. The TEE is isolated from a Rich Execution Environment (REE) in which a rich-OS such as Android, iOS, Windows or Linux can be executed. Examples of embedded hardware technologies which can be used to support TEE implementations include Arm®'s TrustZone®, AMD's Secure Processor and Intel's Trusted Execution Technology. It will be appreciated that the trusted application in the TEE may communicate with an application in the REE. For example, the application in the REE may act as a front end user-interface for the trusted application.

In some examples, when the verification is performed at the application or modem, the verification information at the telecommunications device is periodically updated from the remote server. Thereby, changes in the verification information can be periodically propagated to the device. These changes, can subsequently be processed by the device such that the information (e.g. usage conditions) represented by the verification information can be implemented. By way of example, the verification information can be changed at the instigation of the mobile network operator in response to a user falling behind on monthly payments on a subsidised telecommunications device or in the event that the telecommunications device is lost/stolen. The updated verification information could modify/apply further restrictions on the usage of the telecommunications device.

In some examples, the verification of the subscriber identity module is periodically rechecked, and wherein responsive to a negative re-verification the modem is transitioned from the enhanced operational mode to a limited operational mode. Thereby, the device periodically rechecks whether the subscriber identity module is still valid and returns the modem to a limited operational mode in the event that the subscriber identity module is no longer valid. In some examples, the periodic check could be handled by setting a periodic interrupt to re-perform the verification procedure in the application, mode or server. The re-verification, and propagation of the result, can be handled in the same manner as described in the methods described above.

In some examples, the verification information specifies a first time period and a second time period, wherein during, and until the end of, the first time period the telecommunications device is in a temporary unlock state where the modem can transition to the enhanced operational mode either without requiring the verification step to be performed or where the verification step is automatically passed, and wherein at the expiry of the second time period the telecommunications device contacts a remote eligibility server to request an extension of the first time period. Thereby the device can have a "rolling" first time period which ensures that the device normally remains in a temporary lock state (e.g. temporarily in an enhanced operational mode), while still retaining the ability to force the device into a locked state (e.g. a limited operational mode) by means of the second time period, which from one perspective "forces" the device to periodically recheck whether it is still permitted to remain in the temporary unlock state since in the absence of such a check the device has to perform the "normal" verification step to enter, or remain in, the enhanced operational mode.

As discussed further in the detailed description, the second time period can be set to be shorter than the first time period with a view to ensuring that the first time period is extended before it expires. It will be appreciated, that the remote eligibility server can be implemented as part of the remote server or as a separate server. In some examples, the extension of the first time period takes the form of updated verification information. Such approaches can, for example, provide a technical implementation which allows a mobile network operator to comply with local legal requirements that a device must be sold unlock while still retaining the ability to control the telecommunications device if a user falls behind on payments on their subsidised device.

In some examples, the verification information specifies a third time period and after the expiry of the third time period the telecommunications device enters a permanent unlock state where the modem can transition to the enhanced operational mode either without requiring the verification step to be performed or where the verification step is automatically passed. Thereby the device can, at a predetermined time dictated by the third time period, enter a permanent unlock state (e.g. the device is always able to enter an enhanced operational state). This can save computing resources and bandwidth by avoiding the need for further updates when these are no longer necessary, for example when a contract associated with a subsidised device has reached its end.

In some examples, prior to retrieving the verification information the modem is transitioned from the limited operational mode to an enhanced operational mode for a fourth time period, and wherein subsequent to expiry of the fourth time period the modem is transitioned back from the enhanced operational mode to the limited operational mode if a positive verification that the subscriber identify module has not been made before the expiry of the fourth time period. Thereby, in some examples, the fourth time period can allow the device time to temporarily access resources for the verification operation. For example, temporarily allowing the device to enter an enhanced operational mode can allow the data connection on the modem to be enabled allowing the device to download (updated) verification information and/or contact a trusted time source.

In some examples, the determination that the first time period and/or the second time period and/or the third time period and/or the fourth time period has expired is performed by the application optionally using a trusted time source. Thereby, by using the application to determine whether the time period has expired can make it difficult to bypass the time period protections. Further, by using a trusted time source it can be made more difficult to bypass the time period protections. The trusted time source can be a "real time clock" (RTC) which defines the actual time and not just measures a period since the last invocation of a clock. By using a RTC it can also be made difficult to bypass time period protections. In some examples, the trusted time source is a secure time server such as Trustonic's Technically Trusted Time Teller. In other examples the trusted time source can be dedicated hardware included on the telecommunications device.

In some examples, when the subscriber identity module is detached from the modem, the modem is transitioned to a limited operational mode. Thereby, attempts to bypass the verification check by initially "showing" the device a valid subscriber identity module but then subsequently swapping the valid subscriber identity module for an invalid subscriber identity module is addressed as the device is transitioned back to a limited operational mode and the new "invalid" subscriber identity module would have to pass the verification check itself in order to operate in an enhanced operational mode.

In some examples, either when the subscriber identity module is reinserted into the telecommunications device, or when a second subscriber identity module is inserted into the telecommunications device, the reinserted subscriber identity module or inserted second subscriber identity module must be verified prior to the modem being transitioned from the limited operational mode back to the enhanced operational mode. Thereby, it is ensured that upon the (re) insertion of any subscriber identity module the verification procedure is (re)performed hence enhancing security. This further allows, for examples, for verification procedures which impose restrictions on what subscriber identity modules may be used in conjunction with each other. For example, the mobile network operator subsidising the device may wish to ensure that device only operates in an enhanced operational mode if all subscriber identity modules used in the device originate from the mobile network operator. In other examples, it is sufficient for a single subscriber identity module to have originated from the mobile network operator for the device to operate in an enhanced operational mode.

In some examples, the telecommunications device has a plurality of subscriber identity modules and the method individually or collectively verifies the validity of all of the subscriber identity modules. Thereby, a plurality of network connections can be supported. As described above, the mobile network operator has the freedom to collectively or individually validate the subscriber identity modules. In some examples, the verification information and/or associated conditions could be different for each subscriber identity module "slot". In some examples, the verification information and/or associated conditions could be different for each logical or physical subscriber identity module slot.

In some examples, one or more of the first and second secure channels are established using Elliptic-curve Diffie-Hellman, Elliptic-curve Diffie-Hellman Ephemeral key exchange or any other asymmetric key sharing algorithm. Thereby secure keys can be established without requiring that all keys are pre-injected, for example, at the time of manufacture or as part of the retail supply chain.

In some examples, one or more of the first and second secure channels are established using keys injected to the modem and/or application during manufacture. Thereby, the keys can be established in a secure trusted location where keys can be established on the device free from interference. Furthermore, by establishing the keys in a secure environment a greater range of keys can be established as there is no need for them to be secure when shared over a public/ potentially interceptable connection.

In some examples, one or more of the first and second secure channels are established using keys generated by the modem and/or application. Thereby the expense of per device key injection can be avoided.

In some examples, the two entities at the two ends of the first secure channel and/or the two entities at the ends of the second secure channel each maintain a counter which is monotonically incremented upon exchange of messages, wherein sent messages include a value derived from the sending entity's counter, and wherein the receiving end entity only accepts as valid messages with the value derived from a counter value higher than the receiving end's current counter value. Thereby, security can be enhanced by providing for replay protection. In other words, a replayed message on either of the first or secure channel would not be accepted as valid since the counter value included in the replayed message would have a too small value.

In some examples, the second secure channel can be communicated through the modem between the secured endpoints of the application and the remote server. In some examples, the communication through the modem can be passed along the first secure channel between the application and modem. In other examples, the communication through the modem can be passed along a communication channel between the application and modem other than the first secure channel.

In some examples, the request is generated by the application, the application verifies the subscriber identity module, and the application communicates the verification result to the modem via the first secure channel. Thereby the request and verification is performed by the same entity (i.e. the application) and accordingly the application retains full control.

In some examples, the request is generated by the modem, the application provides the verification information to the modem by the first secure channel and the modem verifies the subscriber identity module. Thereby the request and verification is performed by the same entity (i.e. the modem) and accordingly the modem retains full control.

In some examples, the module identification information comprises an International Mobile Subscriber Identity "IMSI", a Group Identifier "GID" or a Subscription Permanent Identifier "SUPI".

In some examples, when the telecommunications device receives temporary module identification information, a copy of the temporary module identification information is stored on the subscriber identity module and a temporary module identification information authenticator is generated based on the temporary module identification information and an identifier of the telecommunications device, the temporary module identification information authenticator being stored on a storage module of the telecommunications device, wherein when the telecommunications device subsequently initiates a network re-attachment procedure and a temporary module identification information is identified to be present on the subscriber identity module, the temporary module identification information from the subscriber identity module is validated against the temporary module identification information authenticator and the identifier of the telecommunications device, wherein responsive to a positive validation the telecommunications device attempts to attach to the network using the temporary module identification information, and wherein responsive to a negative validation the telecommunications device attempts to attach to the network using the module identification information. Thereby attacks which rely on "spoofing" the temporary module identification information can be resisted since the temporary module identification information is in effect "bound" to the device by means of the temporary module identification information authenticator. Thus the temporary module identification information cannot be transferred from a first device to a second device in a manner which allows for the second device to successfully connect to a telecommunications network without reverifying the module identification information.

In some examples, the temporary module identification information comprises a Temporary Mobile Subscriber Identity "TMSI" or a Globally Unique Temporary UE Identity "GUTI". In some examples, the TMSI/GUTI may be one or more of 5G-S-TMSI, 5G-TMSI, 5G-GUTI or M-TMSI. It will be appreciated that in some examples temporary module identification information technologies can be paired with module identification information technologies. For example, IMSI and TMSI can form a pair.

In some examples, wherein the module identification information is stored in a cache of the telecommunications device after having been read only once on insertion of the subscriber identity module or on boot up of the telecommunications device, wherein when the modem reads the module identification information the modem reads the module identification information from the cache, and wherein when the telecommunications device performs a network attachment procedure the telecommunications device uses the cached module identification information to retrieve the module identification information for the network attachment procedure. Thereby attacks which rely on different module identification information being used for the verification procedure and for network attachment can be addressed. An example such attack is known as a "Turbo SIM" which works by using a physical device which is placed in a telecommunication devices SIM card slot together with a SIM card to manipulate what data is sent to the phone about the SIM card.

Viewed from one perspective, there can be provided a computer program to control a device to perform any of the above-described methods. In some examples, the computer program is stored on a storage medium.

Viewed from one perspective, there can be provided a device comprising: processing circuitry to perform data processing; and data storage storing at least one computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

Figure 1:
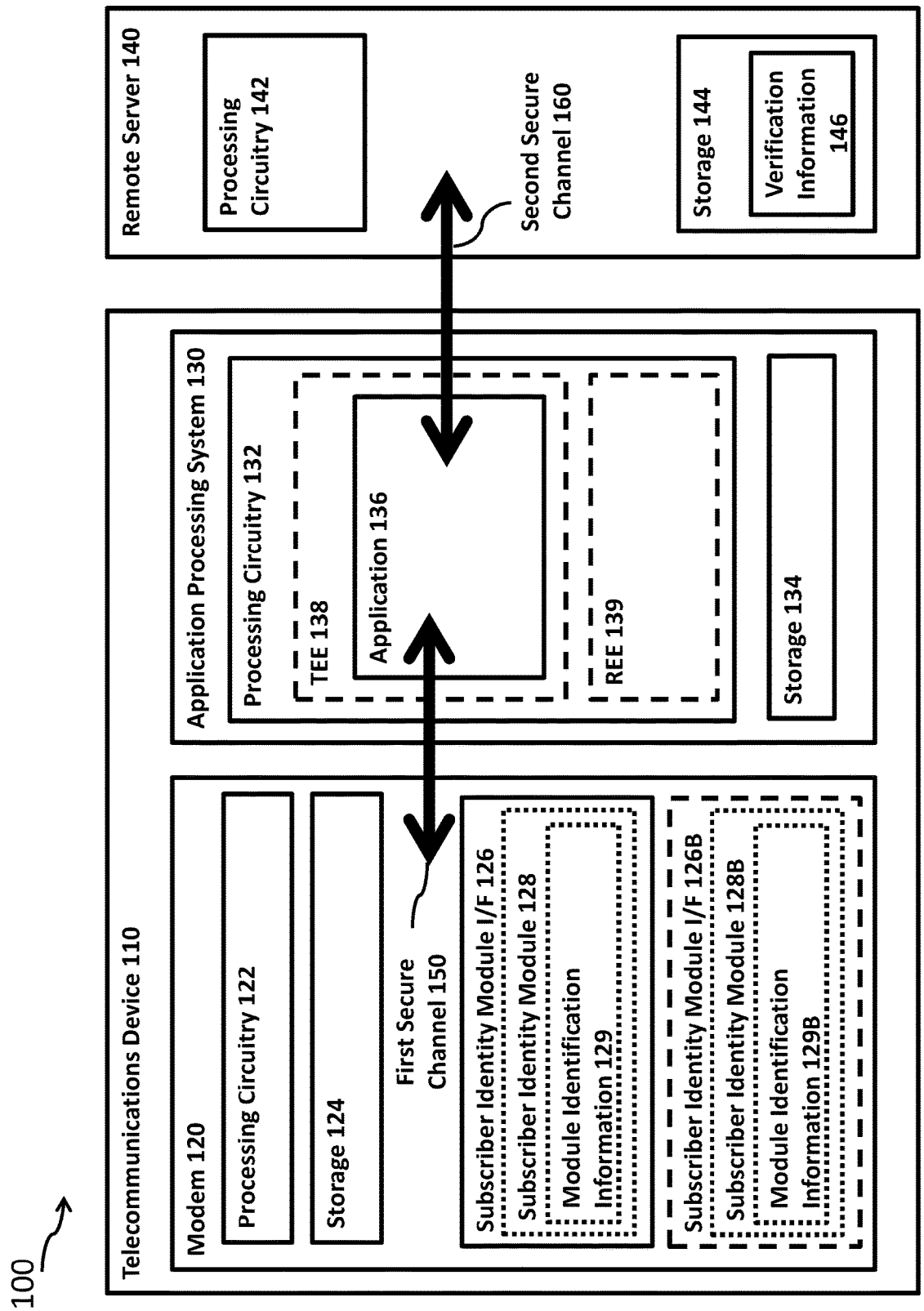
FIG. 1: Schematically illustrates a system configured to operate according to teachings of the disclosure.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

FIG. 1 shows a schematic illustration of a system 100 configured to operate according to teachings of the disclosure. The figure depicts a telecommunications device 110 and a remote server 140. In some examples, the telecommunications device 110 is a mobile phone, tablet, mobile hotspot, laptop with integrated cellular connection or any other device capable of connecting to mobile telecommunications network. In some examples, the remote server 140 is a server operated by a mobile network operator or a device manufacturer. The telecommunications device 110 comprises a modem 120 and an application processing system 130.

The modem 120 includes processing circuitry 122, storage 124 and one or more subscriber identity modules interfaces 126, 126B. It will be appreciated, that in some examples there could be 1, 2, 3, 4, 5, 6, 7, 8, 9 or 10 subscriber identity module interfaces 126. It will be appreciated that the processing circuitry 122 can be any suitable processing circuitry which is capable of executing the steps and functions described as being performed by the modem 120 in this specification. It will be appreciated that the storage 124 can be any suitable storage device capable of storing data and instructions to be processed by the processing circuitry 122. The storage 124 can include both primary and secondary memory and may include read-only memory and/or read-write memory. In some examples, the modem 120 does not include a dedicated storage 124 and instead utilizes storage 134 both for primary and secondary memory. In other examples, storage 124 only includes primary memory and the modem 120 utilizes storage 134 for secondary memory. Where the storage 124 only includes primary memory the modem 120 can receive its firmware from storage 134 during boot and then mount a storage point from 134 to act as its secondary memory.

Each of subscriber identity module interfaces 126, 126B can include a subscriber identity module 128, 128B. It will be appreciated that, from one perspective, the subscriber identity module(s) 128, 128B are not, as such, part of the modem 120 and can be considered as a separate physically or logically removable element. It will be appreciated that in some examples the term subscriber identity module 128, 128B covers a range of physical and non-physical subscriber identity module technologies, for example, SIM, eSIM, UICC, eUICC, USIM, iSIM and TEE-SIM. The subscriber identity module(s) 128, 128B store module identification information 129, 129B respectively. In some examples, the module identification information 129, 129B includes one or more of an International Mobile Subscriber Identity "IMSI", a Group Identifier "GID" and a Subscription Permanent Identifier "SUPI".

The application processing system 130 includes processing circuitry 132 and storage 134. In some examples the processing circuitry 132 is a "full" application processor capable of executing a rich-OS such as Android, iOS, Windows or Linux. The processing circuitry includes an application 136 which performs the steps and functions described as being performed by the application 136 in this specification.

In some examples, the processing circuitry 132 is capable of supporting a trusted execution environment "TEE" 138 and a rich execution environment "REE" 139. The TEE 138 is isolated from the REE 139 in which a rich-OS such as Android, iOS, Windows or Linux can be executed. Examples of processor technologies which can be used to support TEE 138 implementations include Arm's TrustZone, AMD's Secure Processor and Intel's Trusted Execution Technology. Where a TEE 138 is present, the application 136 can, in some examples, be executed inside the TEE 138 to enhance security. It will be appreciated that the storage 134 can be any suitable storage device capable of storing data and instructions to be processed by the processing circuitry 132. The storage 134 can include both primary and second memory and may include read-only memory and/or read-write memory.

Between the modem 120 and the application 136 a first secure channel 150 is established. The first secure channel 150 allows for information to be securely passed between the modem 120 and the application 136. In some examples, the first secure channel can be established using Elliptic-curve Diffie-Hellman, Elliptic-curve Diffie-Hellman Ephemeral key exchange or any other asymmetric key sharing algorithm. In some examples the first secure channel is established using keys injected to the modem and/or application during manufacture. Additionally or alternatively, the first secure channel is established using keys generated by the modem and/or application and may be a symmetric key established secure channel.

The remote server 140 includes processing circuitry which includes processing circuitry 142 and storage 144. It will be appreciated that the processing circuitry 142 can be any suitable processing circuitry which is capable of executing the steps and functions described as being performed by the remote server 140 in this specification. It will be appreciated that the storage 144 can be any suitable storage device capable of storing data and instructions to be processed by the processing circuitry 142. The storage 144 can include both primary and second memory and may include read-only memory and/or read-write memory. The storage 144 stores verification information 146. In some examples, the verification information 146 includes information stating which subscriber identity modules 126 are valid for use with the telecommunications device 110. In some examples, verification information 146 includes conditions on how the telecommunications device 110 is permitted to operate. In some examples, the remote server 140 includes a trusted time source.

Between the application 136 and the remote server 140 a second secure channel 160 is established. The second secure channel 160 allows for information to be securely passed between the application 136 and the remote server 140. In some examples, the second secure channel can be established using Elliptic-curve Diffie-Hellman, Elliptic-curve Diffie-Hellman Ephemeral key exchange or any other asymmetric key sharing algorithm. In some examples the second secure channel is established using keys injected to the modem and/or application during manufacture. Additionally or alternatively, the second secure channel is established using keys generated by the modem and/or application and may be a symmetric key established secure channel.

In some examples, the two entities at the two ends of the first secure channel and/or the two entities at the ends of the second secure channel each maintain a counter which is monotonically incremented upon exchange of messages, wherein sent messages include a value derived from the sending entity's counter, and wherein the receiving end entity only accepts as valid messages with the value derived from a counter value higher than the receiving end's current counter value. In some examples, the counters are incremented by one each time and the check for a "higher" counter value is only accepted if the counter is higher by one.

Figure 2A:
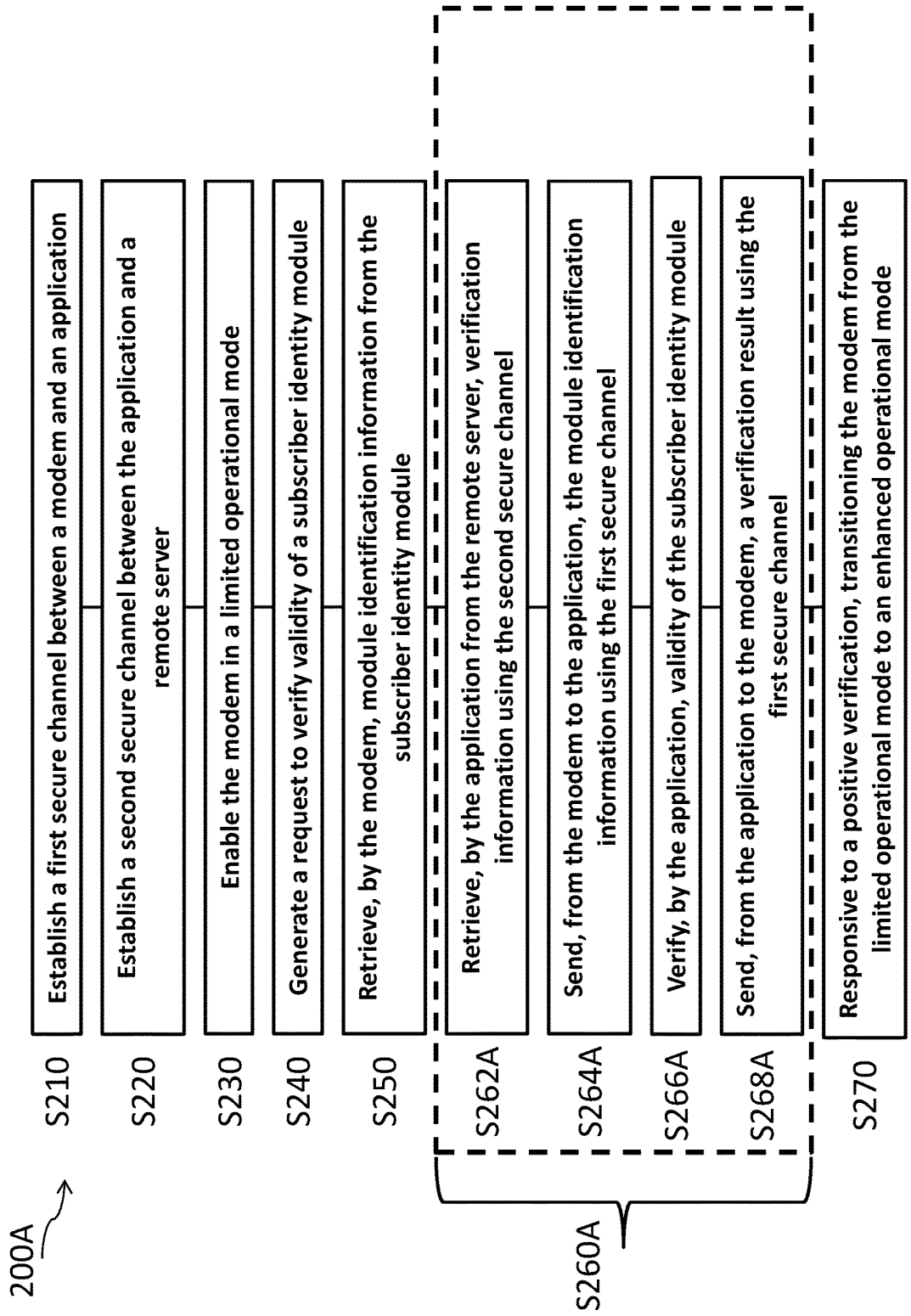
FIG. 2A: Schematically illustrates a method for remotely performing secure change of operational mode of a telecommunications device where an application verifies the validity of a subscriber identity module according to teachings of the disclosure.
Figure 2B:
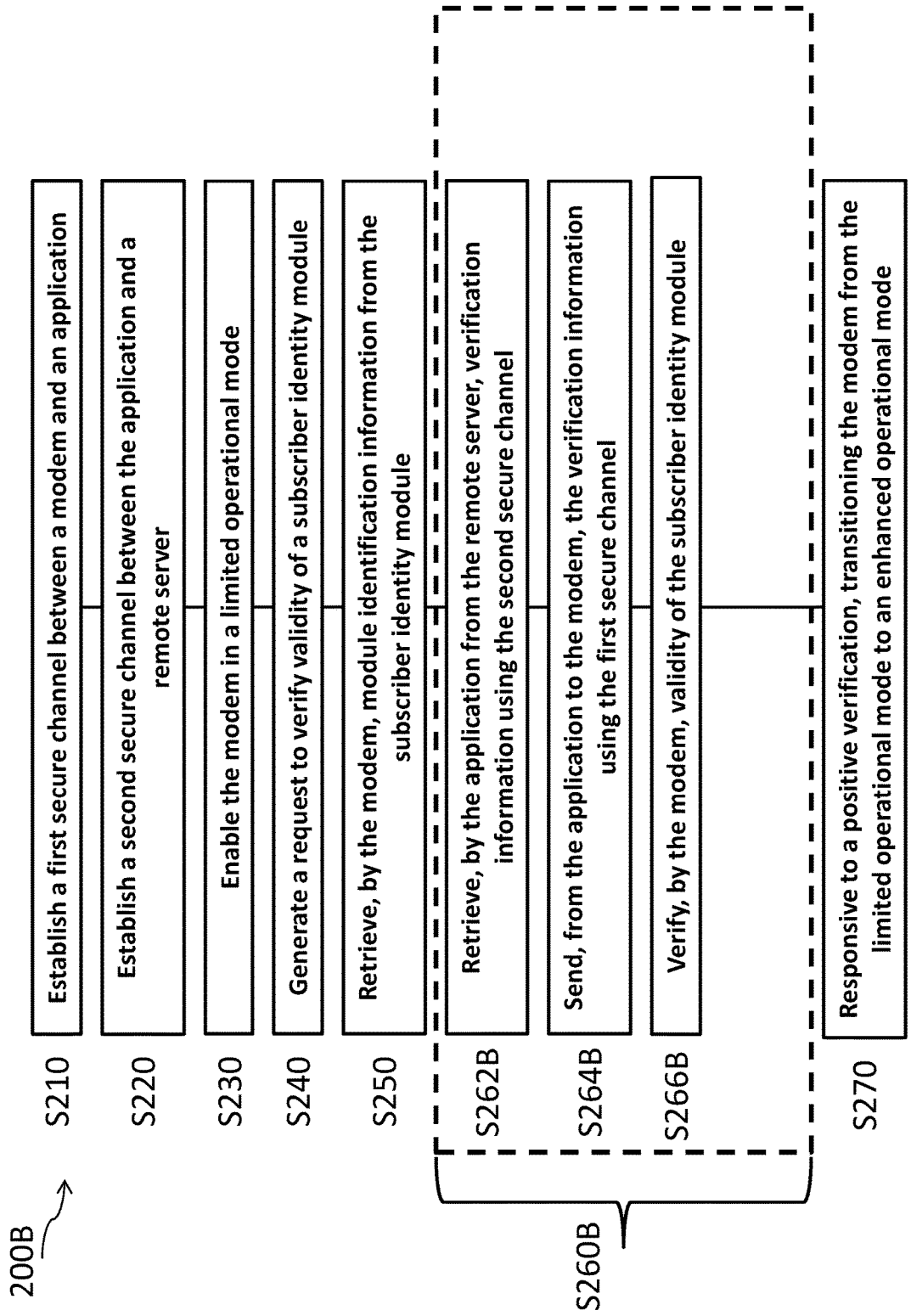
FIG. 2B: Schematically illustrates a method for remotely performing secure change of operational mode of a telecommunications device where a modem verifies the validity of a subscriber identity module according to teachings of the disclosure.
Figure 2C:
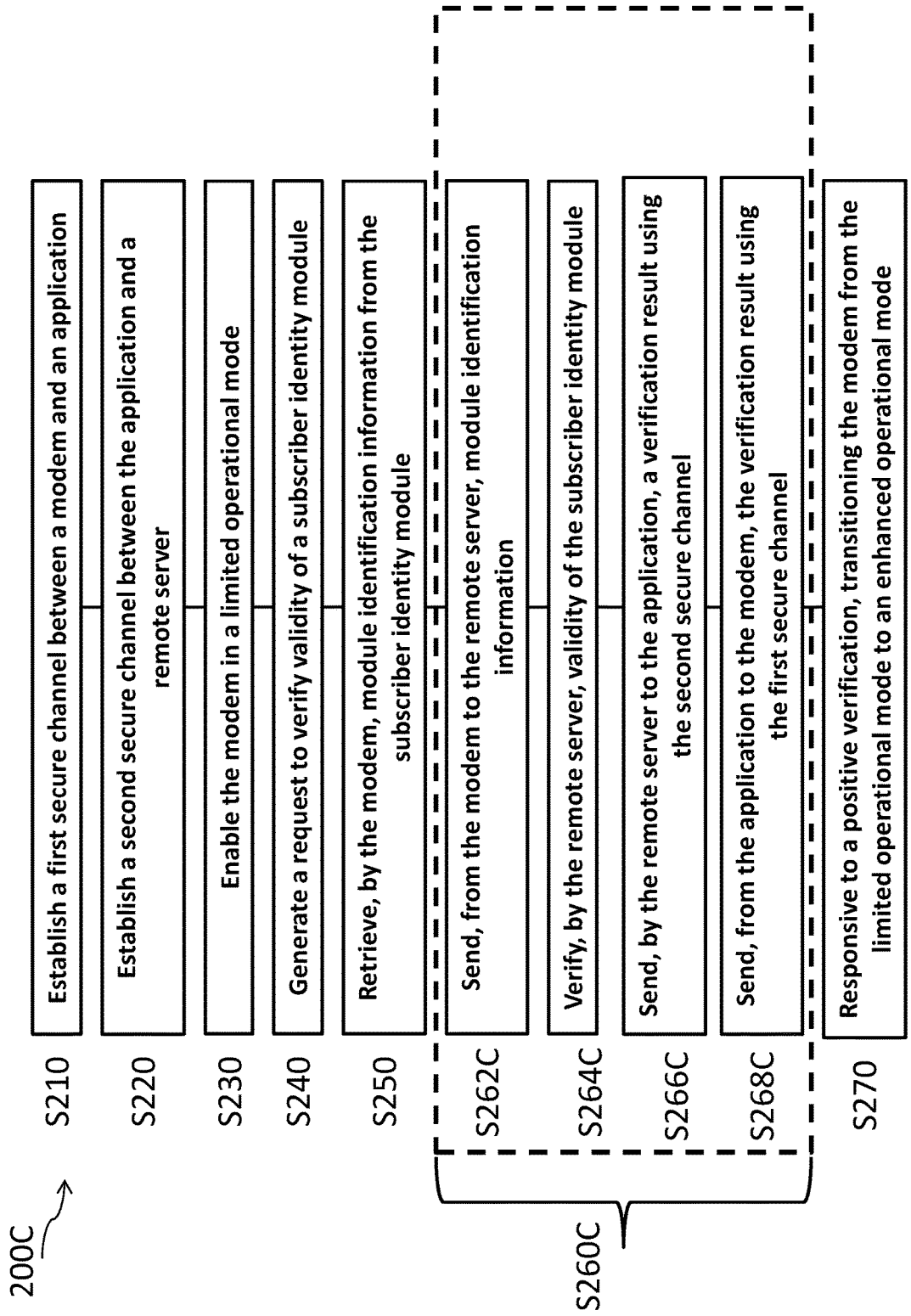
FIG. 2C: Schematically illustrates a method for remotely performing secure change of operational mode of a telecommunications device where a remote server verifies the validity of a subscriber identity module according to teachings of the disclosure.

FIGS. 2A, 2B and 2C show schematic illustrations of methods 200A, 200B and 200C for remotely performing secure change of operational mode of a telecommunications device where various entities verify the validity of a subscriber identity module according to teachings of the disclosure. It will be understood that the methods 200A, 200B and 200C can be implemented on the system 100 depicted in FIG. 1. It will be appreciated that steps S210 to S250, and S270 are common to each of methods 200A, 200B and 200C, with steps S260A/S260B/S260C being performed between step S250 and step S270 in methods 200A/200B/200C respectively.

FIG. 2A shows a schematic illustration of method 200A for remotely performing secure change of operational mode of a telecommunications device where an application verifies the validity of a subscriber identity module according to teachings of the disclosure. The method includes the following steps.

At step S210, a first secure channel is established between a modem of the telecommunications device and an application executing in an Execution Environment of the telecommunications device. The method then continues to step S220.

At step S220, a second secure channel is established between the application and a remote server. The method then continues to step S230.

At step S230, the modem is enabled in a limited operational mode. The method then continues to step S240.

At step S240, a request is generated, by the modem or the application, to verify the validity of a subscriber identity module of the telecommunications devices. The method then continues to step S250.

At step S250, the modem retrieves module identification information from the subscriber identity module. In some examples, this retrieval is performed using a subscriber identity module interface. In method 200A the method then continues to step S262A.

At step S262A, the application retrieves the verification information from the remote server using the second secure channel. The method then continues to step S264A.

At step S264A, the modem sends the module identification information to the application using the first channel. The method then continues to step S266A.

At step S266A, the application verifies the validity of the subscriber identity module using the module identification information and the verification information. The method then continues to step S268A.

At step S268A, the application sends the verification result to the modem using the first secure channel. The method then continues to step S270.

At step S270, responsive to a positive verification result, the modem is transitioned from the limited operational mode to an enhanced operation mode.

It will be appreciated that the exact order of steps depicted in FIG. 2A is merely by way of an illustrative example and that the steps can be performed in any order where the information utilised in a step is available at the respective element, and where utilised, the first/second secure channel has been established. For example, in some examples: S210 can be performed at any point prior to S264A; S220 can be performed at any point prior to S262A; S230 can be performed at any point prior to S270; S240 can be performed at any point prior to step S266A; S250 can be performed at any point prior to S264A; S262A can be performed at any point prior to S266A and after S220; S264A can be performed at any point prior to S266A and after S250; S266A can be performed at any point prior to S268A, after S262A and after S264A; S268A can be performed at any point prior to S270 and after S266A; and S270 can be performed at any time after 268A.

FIG. 2B shows a schematic illustration of method 200B for remotely performing secure change of operational mode of a telecommunications device where a modem verifies the validity of a subscriber identity module according to teachings of the disclosure. The method performs steps S210 to S250 as described above and then continues to step S262B.

At step S262B, the application retrieves the verification information from the remote server using the second secure channel. The method then continues to step S264B.

At step S264B, the application sends the verification information to the modem using the first secure channel. The method then continues to step S266B.

At S266B, the modem verifies the validity of the subscriber identity module using the module identification information and the verification information. The method then continues to step S270 which has been described above.

It will be appreciated that the exact order of steps depicted in FIG. 2B is merely by way of an illustrative example and that the steps can be performed in any order where the information utilised in a step is available at the respective element, and where utilised, the first/second secure channel has been established. For example, in some examples: S210 can be performed at any point prior to S264B; S220 can be performed at any point prior to S262B; S230 can be performed at any point prior to S270; S240 can be performed at any point prior to step S266B; S250 can be performed at any point prior to S266B; S262B can be performed at any point prior to S264B and after S220; S264B can be performed at any point prior to S266B and after S262B; S266B can be performed at any point prior to S270, after S250 and after S264B; and S270 can be performed at any time after 266B.

FIG. 2C shows a schematic illustration of method 200C for remotely performing secure change of operational mode of a telecommunications device where a remote server verifies the validity of a subscriber identity module according to teachings of the disclosure. The method performs steps S210 to S250 as described above and then continues to step S262C.

At step S262C, the modem sends the module identification information to the remote server. The method then continues to step S264C.

At step S264C, the remote server verifies the validity of the subscriber identity module using the module identification information and the verification information. The method then continues to step S266C.

At step S266C, the remote server sends the verification result to the application using the second secure channel. The method then continues to step S268C.

At step S268C, the application sends the verification result to the modem using the first secure channel. The method then continues to step S270 which has been described above.

It will be appreciated that the exact order of steps depicted in FIG. 2C is merely by way of an illustrative example and that the steps can be performed in any order where the information utilised in a step is available at the respective element, and where utilised, the first/second secure channel has been established. For example, in some examples: S210 can be performed at any point prior to S268C; S220 can be performed at any point prior to S266C; S230 can be performed at any point prior to S270; S240 can be performed at any point prior to step S264C; S250 can be performed at any point prior to S262C; S262C can be performed at any point prior to S264C and after S250; S264C can be performed at any point prior to S266C and after S262C; S266C can be performed at any point prior to S268C and after S264C; S268C can be performed at any time prior to S270 and after S266C; and S270 can be performed at any time after S268C.

In some examples, for methods 200A, 200B and 200C, if the subscriber identity module is subsequently detached from the modem, the modem is transitioned back to a limited operational mode.

In some examples, for methods 200A, 200B and 200C, if the subscriber identity module is reinserted into the telecommunications device (for example after it has been detached from the modem), or when a second subscriber identity module is inserted into the telecommunications device, the reinserted subscriber identity module or inserted second subscriber identity module must be verified prior to the modem being transitioned from the limited operational mode to the enhanced operational mode.

In some examples, for methods 200A, 200B and 200C, where the telecommunications device has a plurality of subscriber identity modules, the method individually or collectively verifies the validity of all of the subscriber identity modules.

In some examples, for methods 200A, 200B and 200C, the module identification information is stored in a cache of the telecommunications device after having been read only once on insertion of the subscriber identity module or on boot up of the telecommunications device, wherein when the modem reads the module identification information the modem reads the module identification information from the cache, and wherein when the telecommunications device performs a network attachment procedure the telecommunications device uses the cached module identification information to retrieve the module identification information for the network attachment procedure. In some examples, the cached module identification information is stored in storage 124 of modem 120 as depicted in FIG. 1. In other examples, the cached module identification information is stored in storage 134 of application processing system 130 as depicted in FIG. 1.

Figure 3:
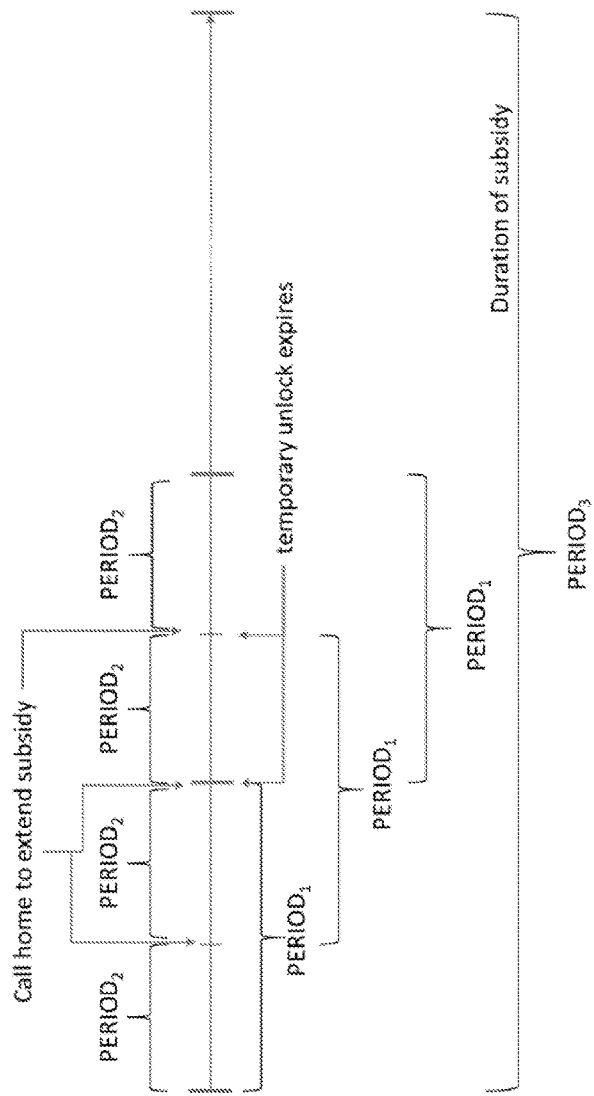
FIG. 3: Schematically illustrates the interplay of first, second and third time periods according to teachings of the disclosure.

FIG. 3 shows a schematic illustration of the interplay of first, second and third time periods according to teachings of the disclosure. This can be implemented on the system 100 depicted in FIG. 1, and can be performed in conjunction with methods 200A, 200B and 200C.

As can be seen, FIG. 3 depicts three periods. Period 1 (first time period) corresponds to a "sliding" window in which the telecommunication device is in a temporary unlock state. Period 2 (second time period) corresponds to a periodic check with, for example a remote eligibility server, to request an extension to the period 1 e.g. to "allow" the period 1 to "slide" along. This is depicted in FIG. 3 below the timeline where a plurality of period 1s are shown at various "slid along" locations. In some examples, period 1 is implemented by allowing, for the duration of period 1, the modem to transition to the enhanced operational mode either without requiring the verification step to be performed or where the verification step is automatically passed. In some examples, period 1 may be set between one day and one month. In some examples, period 2 may be set between twelve hours and two weeks.

In some examples, the period 1 is updated by the telecommunications device receiving and processing updated verification information. In other examples, the period 1 is updated directly, for example, by a secure message being sent to the application.

In some examples, the verification information at the telecommunications device is periodically updated from the remote server and/or remote eligibility server. In some examples, the telecommunications device periodically rechecks the verification of the subscriber identity module, and wherein responsive to a negative re-verification the modem is transitioned from the enhanced operational mode to a limited operational mode.

It will be appreciated that there are trade-offs in setting the length of period 1 and period 2. For example, if period 1 is set too short the temporary unlock can accidentally expire before the telecommunications device has successfully (re) contacted the remote eligibility server to extend the period for which it can be used. This may cause user irritation if it happens too often by rendering the device temporarily inoperable until the user can get the device to connect to the remote eligibility server. If, for example, period 1 is set too long the device may operate in an enhanced operational mode for an extended period of time after it is no longer eligible due, for example, to theft of the device or non-payment of a user's contract. If, for example, period 2 is set too long, the device excessively calls the remote eligibility server to keep extending the device's expiration of the temporary unlock. This can unnecessarily consume bandwidth, processing time and battery life. For example, if period 2 is set too long similar downsides to period 1 may be encountered, where the temporary unlock can accidentally expire before the telecommunications device has successfully (re)contacted the remote eligibility server to extend the period for which it can be used. Again, this may cause user irritation if it happens too often by rendering the device temporarily inoperable (or stuck in a limited operational mode) until the user can get the device to connect to the remote eligibility server.

Period 3 (third time period) corresponds to a total duration which a subsidised device is under contract after which the device enters a permanent unlock state. In some examples, period 3 is implemented by, after the expiry of period 3, the telecommunications device entering a permanent unlock state where the modem can transition to the enhanced operational mode either without requiring the verification step to be performed or where the verification step is automatically passed. In some examples, period 3 may be set between six months and three years.

In some examples, prior to retrieving the verification information the modem is transitioned from the limited operational mode to an enhanced operational mode for a fourth time period (not shown). Where subsequent to the expiry of the fourth time period, the modem is transitioned back from the enhanced operational mode to the limited operational mode if a positive verification of the subscriber identify module has not been made before the expiry of the fourth time period.

In some examples, the determination that the first time period and/or the second time period and/or the third time period and/or the fourth time period has expired is performed by the application using a trusted time source. In some examples, the trusted time source can be a "real time clock" (RTC) which defines the actual time and not just measure a period since its last invocation. By using a RTC it can be made difficult to bypass time period protections. In some examples, the trusted time source is a secure time server such as Trustonic's Technically Trusted Time Teller. In other examples the trusted time source can be dedicated hardware included on the telecommunications device.

Figure 4:
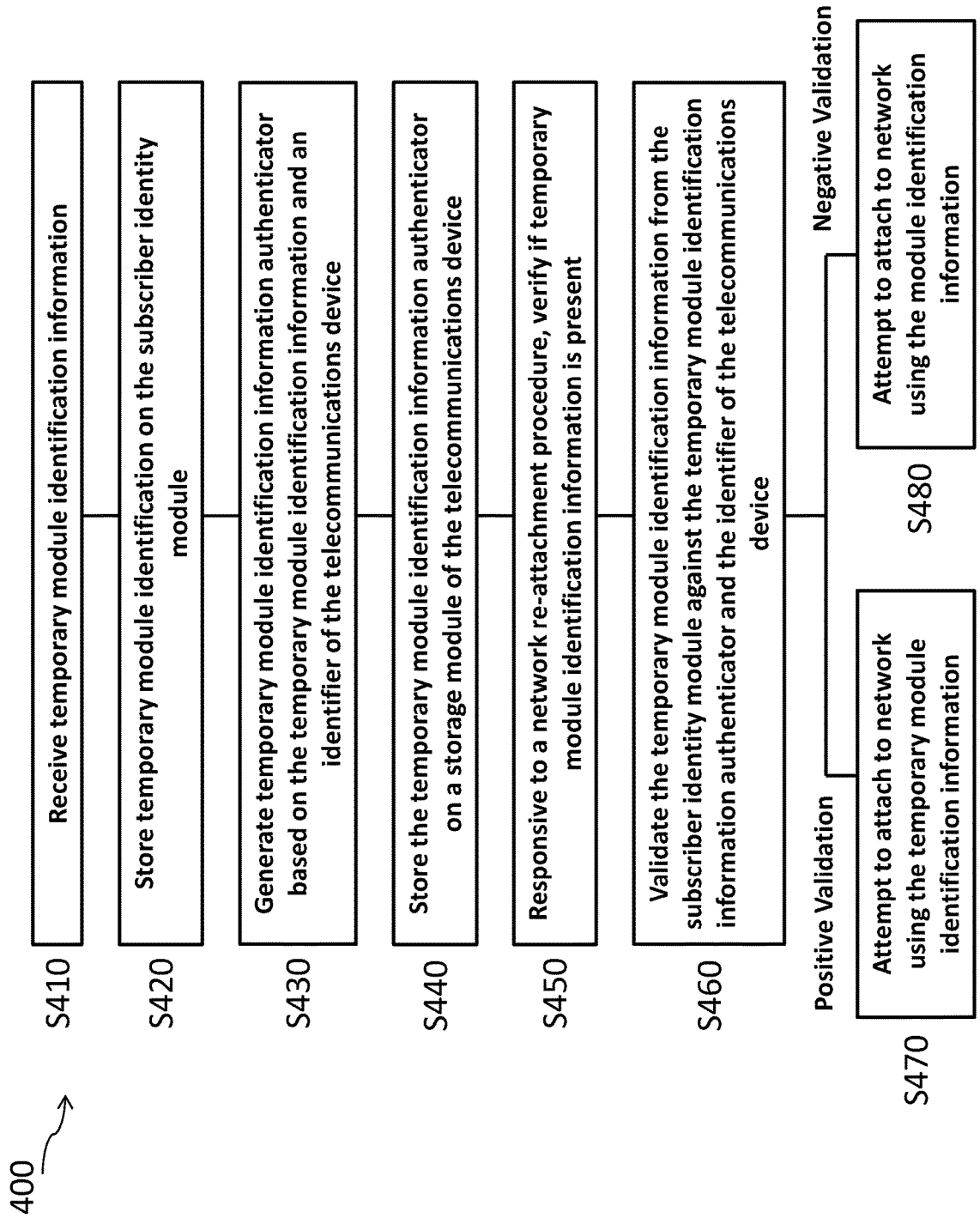
FIG. 4: Schematically illustrates a method whereby the telecommunication device can mitigate certain techniques to bypass the security protections for validating the subscriber identity module.

FIG. 4 shows a schematic illustration of a method whereby the telecommunication device can mitigate certain attacks which attempt to bypass the security protections for validating the subscriber identity module. It will be appreciated that this method can be implemented on the system 100 depicted in FIG. 1, and can be performed in conjunction with methods 200A, 200B and 200C as well as the time periods described in relation to FIG. 3. The method includes the following steps.

At step S410, the telecommunications device receives temporary module identification information. In some examples, the telecommunications device receives the temporary module identification information from a network subsequent to a successful network attachment request. The temporary module identification information can be provided by the mobile network operator to facilitate fast and secure network re-attachments from the telecommunications device to the network in subsequent network attachments. In some examples, the temporary module identification information comprises a Temporary Mobile Subscriber Identity "TMSI" or a Globally Unique Temporary UE Identity "GUTI". The method then continues to step S420.

At step S420, a copy of the temporary module identification information is stored on the subscriber identity module. The method then continues to step S430.

At step S430, a temporary module identification information authenticator is generated based on the temporary module identification information and an identifier of the telecommunications device. In some examples, the temporary module identification information authenticator may be generated using a hashing and/or cryptographic technique. The method then continues to step S440.

At step S440, the temporary module identification information authenticator is stored on a storage module of the telecommunications device. In some examples, the storage module corresponds to one or more of storage 124, and/or storage 134 as depicted in FIG. 1. The method then continues to step S450.

At step S450, responsive to a network re-attachment procedure it is verified if a temporary module identification information is present. In some examples, the verification is performed by the telecommunications device, for example, by the modem and/or application. In other examples, the verification is performed by a remote server. The method then continues to step S460.

At step S460, the temporary module identification information from the subscriber identity module is validated against the temporary module identification information authenticator and the identifier of the telecommunications device. In some examples, the validation is performed by the telecommunications device, for example, by the modem and/or application. In other examples, the validation is performed by a remote server. The method then continues either to step S470 in the event of a positive validation or to step S480 in the event of a negative validation.

At step S470, responsive to a positive validation the telecommunications device attempts to attach to the network using the temporary module identification information.

At step S480, responsive to a negative validation the telecommunications devices attempts to attach to the network using the module identification information.

It will be appreciated that in this manner, attacks which rely on "spoofing" the temporary module identification information can be resisted since the temporary module identification information is in effect "bound" to the device by means of the temporary module identification information authenticator. Thus the temporary module identification information cannot be transferred from a first device to a second device in a manner which allows for the second device to successfully connect to a telecommunications network without reverifying the module identification information.

It will also be appreciated that the exact order of steps depicted in FIG. 4 is merely by way of an illustrative example and that the steps can be performed in any order where the information utilised in a step is available at the respective element. For example, step S420 may be performed after steps S430 and S440.

Figure 5:
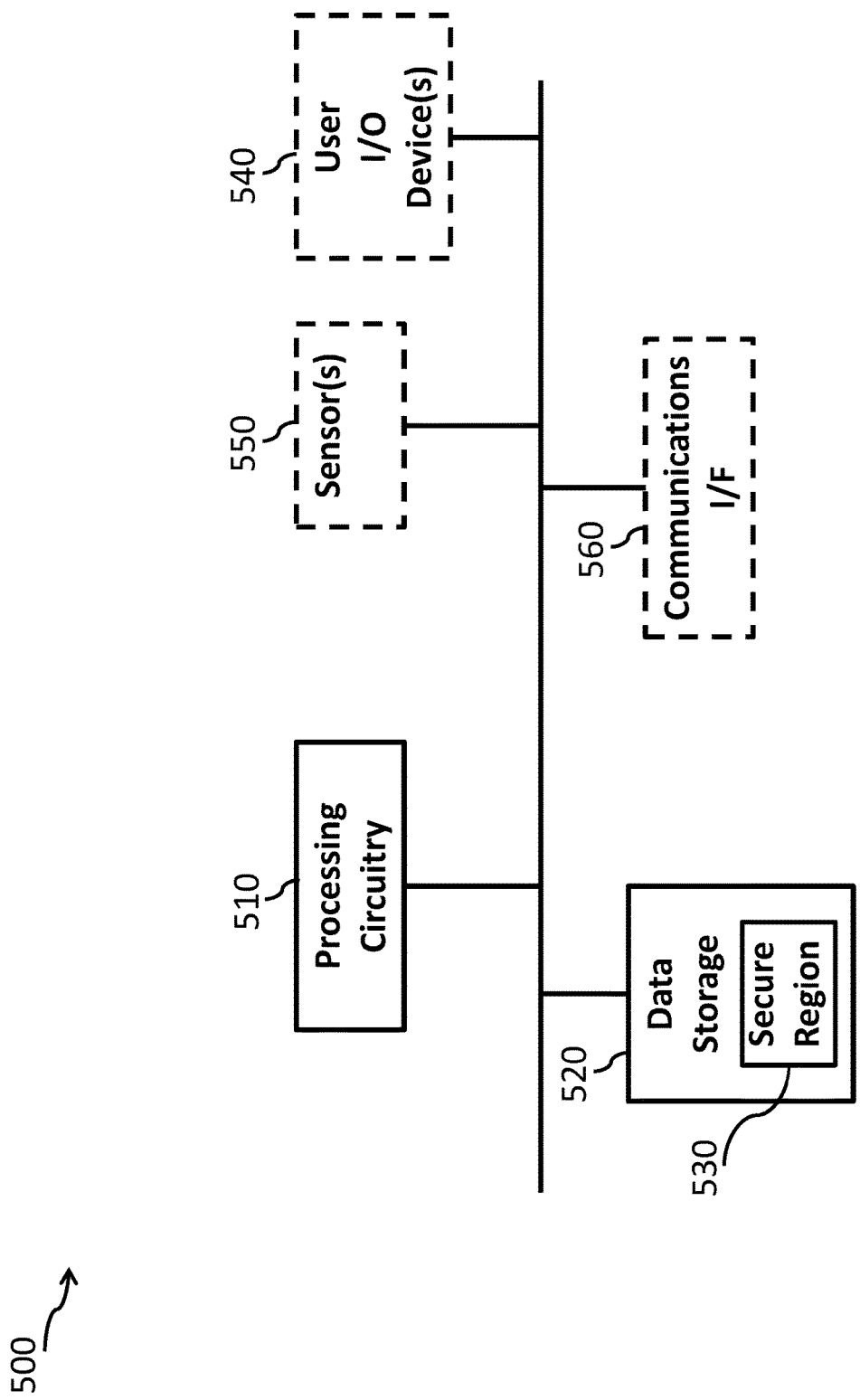
FIG. 5: Schematically illustrates an example of a device which can be used to implement teachings of the disclosure.

FIG. 5 schematically illustrates an example of an electronic device 500 which can be used to implement the telecommunications device 110 and/or remote server 140 as depicted in FIG. 1 as well as any of the methods discussed in relations to FIGS. 2A to 4. The device has processing circuitry 510 for performing data processing in response to program instructions, data storage 520 for storing data and instructions to be processed by the processing circuitry 510. In some examples, the processing circuitry 510 can correspond to processing circuitry which is operable to implement a TEE and a REE. In some examples, the processing circuitry 510 includes one or more caches for caching recent data or instructions. The data storage 520 may have a secure region 530 which is protected by hardware mechanisms (e.g. using memory protection units or security mechanisms providing a TEE) or by software mechanisms (e.g. encryption), so that data stored in a secure region 530 is inaccessible to software not executing within a trusted environment. The device 500 may have a communications interface 560 for communicating with external devices. For example communications interface 560 could use any other range of different communication protocols, such as cellular, Ethernet, WiFi®, Bluetooth®, ZigBee®, etc. The device may have one or more sensors 550 for sensing certain external conditions such as temperature, pressure, the proximity of a nearby user, etc. The specific sensors 550 provided may depend on the purpose of the device. For example sensors 550 may include sensors which aid in biometric authentication such as a fingerprint sensor and a face recognition camera system. It will be appreciated that FIG. 5 is merely an example of possible hardware that may be provided in the device and other components may also be provided. For example, some devices for which user interaction is expected may be provided with one or more user input/output device(s) 540 to receive input from a user or to output information to a user.

The methods discussed above may be performed under control of a computer program executing on a device. Hence a computer program may comprise instructions for controlling a device to perform any of the methods discussed above. The program can be stored on a storage medium. The storage medium may be a non-transitory recording medium or a transitory signal medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

The invention claimed is:

1. A method for remotely performing secure change of operational mode of a telecommunications device, the method comprising:
  establishing a first secure channel between a modem of the telecommunications device and an application executing in an Execution Environment of the telecommunications device;
  establishing a second secure channel between the application and a remote server;
  enabling the modem in a limited operational mode;
  generating a request, by the modem or the application, to verify the validity of a subscriber identity module of the telecommunications device;
  retrieving, by the modem, module identification information from the subscriber identity module;
  retrieving verification information, by the application and from the remote server, using the second secure channel, sending the module identification information from the modem to the application using the first secure channel, verifying at the application whether the subscriber identity module is valid using the module identification information and the verification information, and sending the verification result from the application to the modem using the first secure channel,
  or
  retrieving verification information, by the application and from the remote server, using the second secure channel, sending the verification information from the application to the modem using the first secure channel and verifying at the modem whether the subscriber identity module is valid using the module identification information and the verification information,
  or
  sending the module identification information from the modem to the remote server, verifying at the remote server whether the subscriber identity module is valid using the module identification information and verification information available at the server, sending the verification result from the remote server to the application using the second secure channel, and sending the verification result from the application to the modem using the first secure channel;
  responsive to a positive verification of the subscriber identity module transitioning the modem from the limited operational mode to an enhanced operational mode.

2. The method of claim 1, wherein the application is a trusted application and the Execution Environment is a Trusted Execution Environment.

3. The method of claim 1, wherein when the verification is performed at the application or modem, the verification information at the telecommunications device is periodically updated from the remote server.

4. The method of claim 1, wherein the telecommunications device periodically rechecks the verification of the subscriber identity module, and
  wherein responsive to a negative re-verification the modem is transitioned from the enhanced operational mode to a limited operational mode.

5. The method of claim 1, wherein the verification information specifies a first time period and a second time period,
  wherein during, and until the end of, the first time period the telecommunications device is in a temporary unlock state where the modem can transition to the enhanced operational mode either without requiring the verification step to be performed or where the verification step is automatically passed, and
  wherein at the expiry of the second time period the telecommunications device contacts a remote eligibility server to request an extension of the first time period.

6. The method of claim 5, wherein the verification information specifies a third time period and after the expiry of the third time period the telecommunications device enters a permanent unlock state where the modem can transition to the enhanced operational mode either without requiring the verification step to be performed or where the verification step is automatically passed.

7. The method of claim 6, wherein prior to retrieving the verification information the modem is transitioned from the limited operational mode to an enhanced operational mode for a fourth time period, and
  wherein subsequent to expiry of the fourth time period the modem is transitioned back from the enhanced operational mode to the limited operational mode if a positive verification that the subscriber identify module has not been made before the expiry of the fourth time period.

8. The method of claim 7, wherein a determination that the first time period and/or the second time period and/or the third time period and/or the fourth time period has expired is performed by the application optionally using a trusted time source.

9. The method of claim 1, wherein when the subscriber identity module is detached from the modem, the modem is transitioned to a limited operational mode.

10. The method of claim 1, wherein either when the subscriber identity module is reinserted into the telecommunications device, or when a second subscriber identity module is inserted into the telecommunications device, the reinserted subscriber identity module or inserted second subscriber identity module must be verified prior to the modem being transitioned from the limited operational mode back to the enhanced operational mode.

11. The method of claim 1, wherein the telecommunications device has a plurality of subscriber identity modules and the method individually or collectively verifies the validity of all of the subscriber identity modules.

12. The method of claim 1, wherein one or more of the first and second secure channels are established using Elliptic-curve Diffie-Hellman, Elliptic-curve Diffie-Hellman Ephemeral key exchange or any other asymmetric key sharing algorithm.

13. The method of claim 1, wherein one or more of the first and second secure channels are established using keys injected to the modem and/or application during manufacture.

14. The method of claim 1, wherein one or more of the first and second secure channels are established using keys generated by the modem and/or application.

15. The method of claim 1, wherein two entities at the two ends of the first secure channel and/or two entities at the ends of the second secure channel each maintain a counter which is monotonically incremented upon exchange of messages,
    wherein sent messages include a value derived from a sending entity's counter, and
    wherein a receiving end entity only accepts as valid messages with the value derived from a counter value higher than a receiving end's current counter value.

16. The method of claim 1, wherein the request is generated by the application, the application verifies the subscriber identity module, and the application communicates the verification result to the modem via the first secure channel.

17. The method of claim 1, wherein the request is generated by the modem, the application provides the verification information to the modem by the first secure channel and the modem verifies the subscriber identity module.

18. The method of claim 1, wherein the module identification information comprises an International Mobile Subscriber Identity "IMSI", a Group Identifier "GID" or a Subscription Permanent Identifier "SUPI".

19. The method of claim 1, wherein when the telecommunications device receives temporary module identification information, a copy of the temporary module identification information is stored on the subscriber identity module and a temporary module identification information authenticator is generated based on the temporary module identification information and an identifier of the telecommunications device, the temporary module identification information authenticator being stored on a storage module of the telecommunications device,
    wherein when the telecommunications device subsequently initiates a network re-attachment procedure and a temporary module identification information is identified to be present on the subscriber identity module, the temporary module identification information from the subscriber identity module is validated against the temporary module identification information authenticator and the identifier of the telecommunications device,
    wherein responsive to a positive validation the telecommunications device attempts to attach to the network using the temporary module identification information, and
    wherein responsive to a negative validation the telecommunications device attempts to attach to the network using the module identification information.

20. The method of claim 19, wherein the temporary module identification information comprises a Temporary Mobile Subscriber Identity "TMSI" or a Globally Unique Temporary UE Identity "GUTI".

21. The method of claim 1, wherein the module identification information is stored in a cache of the telecommunications device after having been read only once on insertion of the subscriber identity module or on boot up of the telecommunications device,
    wherein when the modem reads the module identification information the modem reads the module identification information from the cache, and
    wherein when the telecommunications device performs a network attachment procedure the telecommunications device uses the cached module identification information to retrieve the module identification information for the network attachment procedure.

22. At least one non-transitory, computer-readable medium storing a computer program to control a device to perform the method of claim 1.

23. A device comprising:
    processing circuitry to perform data processing; and
    non-transitory data storage storing at least one computer program for controlling the processing circuitry to perform the method of claim 1.

* * * * *